March 30, 1965 A. P. GOUVEIA 3,175,807
METHOD AND APPARATUS FOR PREPARING A FIBER-REINFORCED
MOLDING COMPOSITION
Filed Feb. 28, 1961

INVENTOR.
A. PETER GOUVEIA
BY
ATTORNEY

United States Patent Office 3,175,807
Patented Mar. 30, 1965

3,175,807
METHOD AND APPARATUS FOR PREPARING A FIBER-REINFORCED MOLDING COMPOSITION
A. Peter Gouveia, Somerville, N.J., assignor to Johns-Manville Corporation, New York, N.Y., a corporation of New York
Filed Feb. 28, 1961, Ser. No. 92,363
9 Claims. (Cl. 259—21)

This invention relates generally to improved method and apparatus for feeding particulate material in dispersed condition. It further relates to method and apparatus for feeding fibrous material in a fluffy condition to a molding solution and for uniform dispersion therein. More particularly this invention relates to method and apparatus which employs a fluid stream for entraining particulate material and projecting the material at a controlled rate and in a preferred pattern into a molding solution and for uniform mixing therewith to form a particulate reinforced molding composition.

Heretofore, in preparing particulate reinforced molding compositions, the dry particulate filler materials, particularly fibers, have been dispersed manually or fed gravitationally in a random or haphazard manner directly from the supply hoppers. With manual dispersion it will be readily apparent that the degree of uniformity in distribution is contingent upon the skill of the operator and that the operator's skill will vary from time to time. In gravitational systems not only will the distribution vary as the pressure head varies but also any agglomerates present in the feed hoppers will tend to remain as agglomerates in the molding solution into which they are fed and create "dry spots" in the molded product. In such systems uniform dispersion of the particulate materials is controlled only by agitation within the mixing chamber and hence the mixing time is increased in an attempt to achieve uniformity in distribution.

The occurrence of "dry spots," agglomerates of fibers uncoated with molding compound, substantially weaken the molded product and hence are undesirable. Such "dry spots" are not perceptible in the final product unless they are present at the surface. Consequently, in molding plastic products which cannot be effectively inspected or tested for "dry spots" before being placed in service, any step in the preparation of molding compounds which minimizes the occurrence of "dry spots" would represent an advantage in the art.

Accordingly, it is an object of this invention to provide new and improved method and apparatus for uniformly feeding particulate material.

Another object is to provide new and improved method and apparatus for uniformly feeding fibrous material in a fluffy or flocculent condition.

Another object is to provide new and improved fiber feeding apparatus in combination with agitating means to uniformly disperse particulate materials within a molding solution to provide a homogeneous molding composition.

A more detailed object is to provide an air stream for projecting a supply of fibers at a controlled rate and in a preferred pattern into a mixing chamber containing a molding solution and for uniform mixing therewith to form a fiber reinforced molding composition.

A still further object is to provide new and improved method and apparatus for simultaneously and uniformly dispersing several types of particulate materials into a molding solution to form a molding composition.

The foregoing objects and others ancillary thereto are preferably accomplished as follows:

According to a preferred method of this invention a predetermined and measured amount of distended fibers is controllably entrained in an air stream; the air stream further distends the fibers and projects them in a fluffy condition directly to the surface of a molding solution. The fibers are preferably discharged at a controlled rate to an intersection of mixing or agitating blades employed to mix the fibers with the solution to facilitate a high degree of uniformity of distribution. The mixing within the chamber containing the solution continues for a short period after the introduction of all of the fibers into the solution to further enhance uniformity of distribution and attainment of a homogeneous mixture. While the mixing step is being conducted, the air stream, depleted of fibers, is exhausted as a current through a foraminous member circumposing at least a portion of the member defining and confining the air stream in its path before discharge. The foraminous member serves to control the discharge rate of the air stream and to entrap any fiber particles remaining in the air current before exhausting to the ambient air. The discharge end or nozzle of the air stream confining member is preferably adjustable to accomplish discharge of the fibers at a preferred level above the surface of the molding solution. The parameters of the fan, or other media employed to create and direct the air stream, together with the type and volume of molding solution, and the parameters of the mixing chamber will dictate the level at which the fibers should be discharged for optimum uniformity of distribution. Control of distribution of the fiber upon the surface of the molding solution may also be effected by providing interchangeable discharge nozzles of various shapes and sizes.

This invention provides the advantages of separation of fibers in an air stream to disperse the fiber agglomerates and of automatic control of the distribution of the fibers throughout a volume of molding solution and thereby eliminates or minimizes the occurrence of "dry spots."

Apparatus for distending and conveying fibers with an air stream have been employed heretofore; however, in such apparatus the fibers are dispersed upon travelling foraminous members to form a fibrous mat. The mats are formed by applying suction to the travelling members on the side opposite to that upon which the fibers are laid. The thickness of the mat is controlled by regulating the speed at which the foraminous members travel. In some instances, the resultant mats are subsequently sprayed with or immersed in resinous or other solutions. In such prior method and apparatus where the fibers have been dispersed to form preforms, which preforms are subsequently used in molding operations by spraying with or immersing in resinous or other solutions there has been no recognition that fibers could be uniformly dispersed into a molding solution without forming a fibrous mat or other preform.

The novel features considered characteristic of this invention are set forth with particularity in the appended claims. The invention itself, however, will be best understood from the following description of specific embodiments when read in connection with the accompanying drawing in which similar numerals are employed to designate similar parts throughout and:

Figure 1:
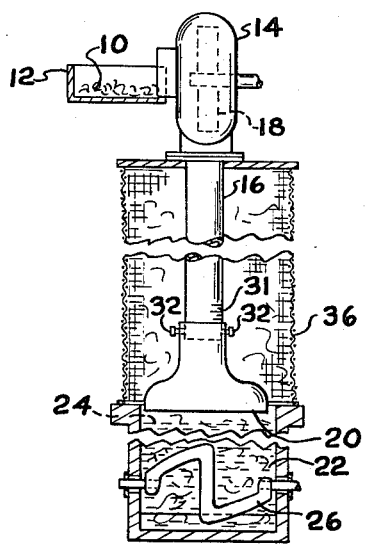
FIG. 1 is an elevational view of particulate material dispersing apparatus in combination with mixing apparatus and in accordance with this invention for preparing a molding composition.
Figure 2:
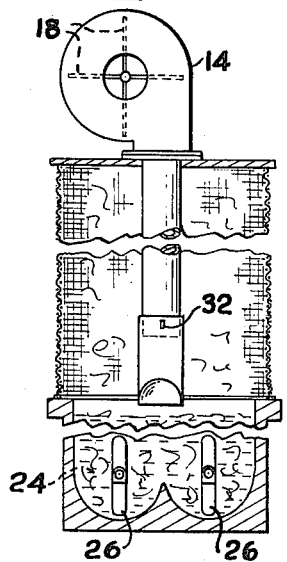
FIG. 2 is a side elevational view of the dispersing apparatus shown in FIG. 1.
Figure 4:
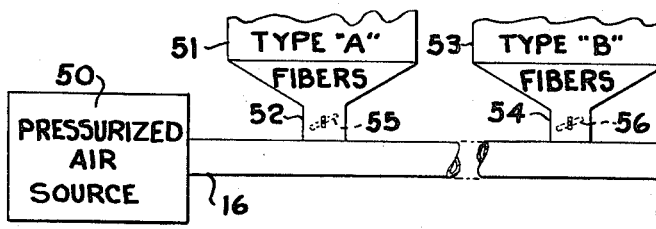
Figure 3:
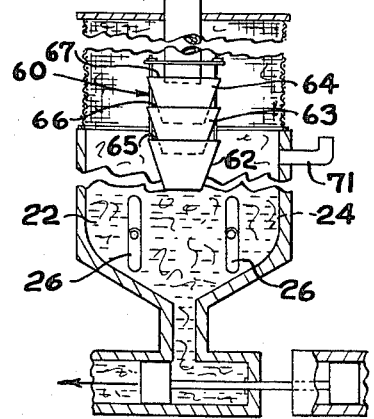
Figure 3:
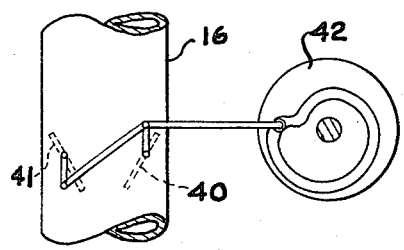

FIG. 3 is a view of a fragment of the dispersing apparatus as disclosed in FIG. 1 and shown in connection with automatic means for programing the dispersion of particulate material during a mixing cycle; and FIG. 4 is a side elevational view of an alternate form of dispersing apparatus particularly adapted for mixing several types of particulate material and of an alternate form of conduit which is particularly adapted for recirculating particles and some of the normally exhausting air current.

Referring to FIG. 1, a source of distended fibers 10, preferably a measured amount, is placed within a feeding trough 12. A blower fan 14 inspirates the fibers 10 and projects them as a stream into conduit 16. The blades 18 of the fan 14, in addition to creating the air stream in which the fibers are projected also serve to mechanically further distend the fibers. The fibers 10 are discharged from the terminal end or nozzle 20 of conduit 16 into a mixing chamber 22. The nozzle 20 is preferably vertically adjustable and interchangeable with other nozzles having various outlet configurations for reasons hereinafter to be described.

The mixing chamber 22 contains a resinous or other suitable molding solution 24 to be reinforced with the fibers 10. Within the mixing chamber 22 are positioned blades 26, preferably arranged in pairs, which agitate the molding solution 24. The blades 26 may be of the sigma or other suitable type for mixing and kneading an admixture of fibers and molding solution to form a molding composition.

The nozzle 20 of conduit 16 is preferably positioned to direct the stream of fibers to an area midway between the pair of blades 26 in order to obtain the maximum intermixing of fibers and molding solution. The preferred dispersion pattern of the fibers upon the surface of the solution is dictated by the type of fibers, type of molding solution, the parameter and capacity of the blower fan or other air stream creating means, and the parameter of the mixing chamber. The discharge pattern can be regulated by varying the elevation of the nozzle 20. Various configurations of discharge nozzles may also be employed to suit the conditions existing when mixing a particular batch of molding solution. Also, various indicia may be employed to duplicate desired conditions. For example, set screws 32 may be employed to secure the discharge nozzle 20 in alignment with graduations 31 corresponding to the desired elevation above the molding solution within the mixing chamber.

To further enhance mixing of the fibers with the molding solution, each of the blades 26 may be rotated at a rate different from the other to produce a kneading or folding action.

The air stream emanating from the discharge nozzle 20 after depositing the fibers upon the surface of the molding solution or batch ascends for exhaustion through the foraminous or perforate member 36 circumposing conduit 16. The member 36 serves to control the rate at which the air is exhausted and also to entrap any fiber particles remaining in the ascending air current.

As the fibers are progressively added to the molding solution, the solution becomes more viscous and hence the rate of agitation is decreased. Therefore it may be desirable in some instances to provide means for programing the rate of discharge of the fibers into the molding solution in order to attain optimum uniformity in distribution. This programing may be accomplished by means of cam-actuated dampers 40 and 41 positioned in conduit 16 in the manner shown in FIG. 3. The cam 42 preferably provides a maximum dampening opening at the start of the mixing cycle and progressively decreases the opening to a minimum at the end of the cycle when the molding composition or batch is most viscous.

The present method and apparatus is not limited to the preparation of any particulate molding composition. Almost any molding composition can be prepared which employs a hardenable fluid component and a particulate reinforcing or matrix component such as asbestos fibers.

An example of composition which has been satisfactorily prepared according to the method and with the apparatus of the present invention is the following:

| | Parts by weight |
|---|---|
| Filler (calcium carbonate) | 270.0 |
| Lubricant (zinc stearate) | 20.0 |
| Catalyst (benzoyl peroxide-tricresyl phosphate) | 7.5 |
| Resin (polyester) | 360.0 |
| Fiber (asbestos) | 360.0 |

In the preparation of test samples hereinafter described, the filler and lubricant were placed into mixing chamber 22 and intermixed for four minutes. The catalyst and resin constituents were then added and the admixture mixed for five minutes.

The foregoing described steps were identical in preparing the separate batches for each of the respective listed samples. The data in the following table shows the effect of manually dispersing, by an experienced operator, the fibers as uniformly as humanly possible, and of varying the position of the outlet of the discharge nozzle above the level of solution. Each of the batches was constantly mixed during and after introduction of the fibers for a period of seven minutes. Test specimens of identical shapes were then prepared and tested according to ASTM specifications.

| | Nozzle Ht./in. | Notched Izod, ft.-lb./in. notch | Flexural Strength, p.s.i. | Flexure Modulus, p.s.i. ×10⁶ |
|---|---|---|---|---|
| Manually Dispersed | | 1.28 | 8,700 | 1.09 |
| Apparatus Dispersed | 8 | 1.21 | 10,600 | 1.39 |
| | 6 | 1.26 | 9,900 | 1.37 |
| | 4 | 1.32 | 9,700 | 1.32 |

In FIG. 4 another embodiment of the invention is illustrated whereby a number of different particulate material or fiber types, different in composition and/or size, may be uniformly dispersed into a batch of molding solution. A supply of pressurized air, generally designated by the numeral 50, which may originate from any suitable source such as a blower fan or a factory pneumatic system, is projected into conduit 16 to entrain a first fiber, designated as type "A," from hopper 51 through discharge nozzle 52. The air stream then progresses past a nozzle 54 of hopper 53 where a second type of fiber, designated as type "B," is entrained to provide an admixture of "A" and "B" fibers. The admixture is then projected into the molding solution in the same manner described in connection with the embodiment illustrated in FIG. 1. It will be readily apparent that other dry ingredients may be added from hoppers similarly arranged along and for inspiration into the air stream.

The volume of fibers entrained from each of the hoppers may be proportioned by regulating the respective valves 55 and 56 in the discharge nozzles 52 and 54. In addition, the total volume of fibers projected into the molding solution may be controlled by programing the time during which the source of air operates by any suitable clocking mechanism.

FIG. 4 illustrates a louvered or labyrinth type conduit 60. This type of conduit 60 is particularly adapted for use with fibers which tend to move with the air current as it ascends from the molding solution. The storied conduit sections 62, 63 and 64 define a plurality of openings 65, 66 and 67 through which fiber particles may be recirculated for projection into the molding solution. The arrangement shown in FIG. 4 also increases the volume of air that is being circulated since the initially projected stream as it passes the openings in the conduit aspirates additional air.

FIG. 4 also illustrates a continuous extruder 70 in combination with the apparatus of the present invention. The mixing chamber 22 may be provided with a supply pipe 71 to facilitate the continuous feeding of non-fibrous ingredients such as the resinous molding solution.

In those situations where it is felt that further mechanical distending of fibers is not required, or that the nature of fibers make it undesirable to pass them through the impeller blades of a fan, the fan may be positioned to create a stream which aspirates the fibers in a manner similar to that in FIG. 4. In this arrangement only air is passed through the fan and the air stream entrains the fibers from the feed station and projects the fibers for dispersion with the molding solution.

Although certain and specific embodiments of the invention have been shown and described, many modifications thereof are possible. Therefore, this invention is not to be restricted except as necessitated by the prior art and by the spirit of the appended claims.

What I claim is:

1. The method of forming a molding composition for molding fiber reinforced products, which comprises in combination: propelling a fluid stream containing fibers in fluffy condition directly to the surface of a batch of molding solution confined in a chamber to form an admixture of fibers and molding solution, and subjecting said admixture to internal mechanical agitation to form a substantially homogeneous mass.

2. A method of forming a fiber reinforced molding composition, which comprises in combination: providing a source of fibers; entraining said fibers in a stream with a fluid propellant; projecting said fibers in a fluffy condition directly to the surface of a molding solution for adherence therewith; and subjecting the admixture of fibers and molding solution to a mechanical mixing action whereby a substantially homogeneous mass is produced.

3. The method as described in claim 2 which further comprises the step of discharging at an elevation above the top level of said admixture the gaseous fluid propellant from which the patriculate material has been projected.

4. A method for forming a fiber reinforced molding composition which comprises in combination: providing a predetermined amount of distended fibers; entraining said fibers and projecting them as a stream in a fluffy condition downwardly from a fixed level to the surface of a molding solution contained in a mixing chamber, said stream being directed to an intersection of mixing blades contained in said chamber; rotating one of said blades at a rate different from the other thereby enfolding an admixture of said fibers and said molding solution and constantly changing the surface to which additional fibers are presented; and exhausting the propellant of said stream upwardly as a current from said admixture to a foraminous member and thus entrap any fiber particles remaining in the current as it is discharged.

5. A method of forming a fiber reinforced molding composition having a plurality of fiber types, comprising in combination: providing a source of a first type of fiber and of a second type of fiber; entraining said first type of fiber and projecting said first type fiber as a fluid stream; entraining said second type of fiber into said fluid stream; projecting the admixture of said first and second fibers in a fluffy condition to the surface of molding solution confined in a chamber; and constantly agitating said solution as said fibers are projected thereon.

6. Apparatus for preparing a fiber reinforced molding composition, comprising in combination: a feed trough adapted to contain a supply of distended fibers; a blower fan having its inlet adjacent to said feed trough and entraining fibers in the atmospheric air stream passing therethrough; directing means forming an extension of the outlet of said fan and for transferring said fibers as a stream in a fluffy condition; and a mixing chamber adapted to contain a measured volume of molding solution, said chamber being aligned with said directing means to direct said fibers to the intersection of a pair of mixing blades mounted within said chamber.

7. Apparatus as described in claim 6, wherein said directing means is vertically adjustable.

8. Apparatus as described in claim 6, wherein said directing means is louvered.

9. Apparatus as described in claim 6, which further comprises perforated means circumposing at least a portion of said directing means for exhausting the air discharged from said directing means and ascending from the molding solution.

References Cited by the Examiner

UNITED STATES PATENTS

| | | | |
|---|---|---|---|
| 1,120,534 | 12/14 | Pruden | 259—26 |
| 1,250,918 | 12/17 | MacMichael | 259—147 |
| 2,073,779 | 3/37 | Bramsen | 259—6 X |
| 2,318,339 | 5/43 | Stone | 259—147 X |
| 2,516,436 | 7/50 | Walker | 259—25 X |
| 2,565,696 | 8/51 | Moller et al. | 259—151 |
| 2,754,982 | 7/56 | Hoffmeister et al. | 302—59 |
| 2,987,760 | 6/61 | Grubenmann et al | 259—104 X |
| 3,041,049 | 6/62 | Tarukawa | 259—9 |

WALTER A. SCHEEL, *Primary Examiner.*

LEO QUACKENBUSH, CHARLES A. WILLMUTH, *Examiners.*